United States Patent [19]

Lyon

[11] Patent Number: 4,955,158
[45] Date of Patent: Sep. 11, 1990

[54] PLANT WATERING MAT

[75] Inventor: William E. Lyon, Westbury, N.Y.

[73] Assignee: Plant Tech., Horticultural Products Inc., Westbury, N.Y.

[21] Appl. No.: 167,001

[22] Filed: Mar. 9, 1988

[51] Int. Cl.⁵ .............................................. A01G 25/00
[52] U.S. Cl. ............................................ 47/81; 47/79
[58] Field of Search ............................. 47/81, 59–65, 47/79, 80, 82; 248/118, 631

[56] References Cited

U.S. PATENT DOCUMENTS

| | | | |
|---|---|---|---|
| 1,812,113 | 6/1931 | Nelson | 47/79 |
| 2,076,071 | 4/1937 | De Bolt | 248/22 |
| 3,106,043 | 10/1963 | Ferrand | 47/81 |
| 3,679,159 | 7/1972 | Bach et al. | 248/22 |
| 3,778,928 | 12/1973 | Green | 47/48.5 |
| 4,245,434 | 1/1981 | Green | 47/80 |

FOREIGN PATENT DOCUMENTS

| | | | |
|---|---|---|---|
| 557638 | 6/1931 | Fed. Rep. of Germany | 47/9 |
| 648894 | 12/1928 | France | 248/631 |
| 712422 | 10/1931 | France | 248/22 |
| 1543924 | 4/1979 | United Kingdom | 47/80 |
| 2068204 | 8/1981 | United Kingdom | 47/9 |

*Primary Examiner*—Robert A. Hafer
*Assistant Examiner*—Charles H. Sam
*Attorney, Agent, or Firm*—Darby & Darby

[57] ABSTRACT

The present invention relates to an improved capillary mat for water plants. The mat includes a lower piece of the air bubble type material. This provides a support base to be laid in a tray leaving space for a water reservoir between the air cells. In accordance with the present invention, instead of using a fiber type material for the top piece on which the plant is rested, a piece of solid sheet plastic material is used. The sheet of plastic material has a number of holes therein. The plastic sheet material is only sealed to the bubble packed material at certain places so that water can travel by an adhesion type effect in the free space between the plastic sheet layer and the air bubble material and exit through the holes in the sheet to the plant pot. The center structure is of waterproof material. The plastic sheet layer will not become discolored and can be wiped clean if any unwanted material deposits on top of it.

10 Claims, 1 Drawing Sheet

PLANT WATERING MAT

Applications exist for mats on which potted plants or plants in wicker baskets are placed to provide a watering action to the plants through the bottom of the pot or basket. Generally, the pot would have a hole or is porous. Heretofore, various types of capillary mats have been used. Such capillary mats rely upon the effect of fibers being able to transmit water on and throughout the entire area of the mat by a capillary action. The capillary mat is usually placed on top of a platform which rests in the reservoir, often a tray, which holds the supply of water for the plant.

In applicant's prior co-pending application Ser. No. 693,102, filed Jan. 22, 1985, replaced by continuation application Ser. No. 870,642 filed Apr. 29, 1986, a novel capillary mat is described which combined the functions of the platform and the mat into one. That mat basically had a lower portion formed of air bubble type plastic packaging material having a bottom layer with a number of air cells and a top layer which sealed the cells. The space between the bubbles was part of the reservoir for the liquid. A piece of fibrous material, for example, a polyester, was bonded to the top surface of the air bubble material. When the bubble-type material was laid in the tray, it formed a supporting surface for the plant pots to be placed on top of it and the fiberous material provided the capillary action for the liquid in the reservoir to the plant pot.

While the capillary mat described above is perfectly satisfactory, it had a disadvantage in that many plants use a type of fertilizer or the soil contains some type of a salt, or the water itself has minerals. When the fertilizer or salt came in contact with the fiber material of the capillary mat, the capillary mat often discolored making it somewhat unattractive. In addition, the entire surface of the mat would be wetted. While this in many cases was advantageous from the point of view that the water would evaporate into the foliage of the plant, in other cases such evaporation was not desirable from the point of view of making the foliage too wet or else the water from the reservoir tray on which the mat was placed would be used too quickly because of the evaporation.

BRIEF DESCRIPTION OF THE INVENTION

The present invention relates to an improved capillary mat for water plants which overcomes the deficiencies referred to above. The mat includes a lower piece of the air bubble type material. This provides a support base to be laid in a tray leaving space for a water reservoir between the air cells. In accordance with the present invention, instead of using a fiber type material for the top piece on which the plant is rested, a piece of solid sheet plastic material is used. The sheet of plastic material has a number of holes therein. The plastic sheet material is only sealed to the bubble packed material at certain places so that water can travel by an adhesion type effect in the free space between the plastic sheet layer and the air bubble material and exit through the holes in the sheet to the plant pot. The center structure is of waterproof material. The plastic sheet layer will not become discolored and can be wiped clean if any unwanted material deposits on top of it.

OBJECT OF THE INVENTION

Accordingly, it is the object of the present invention to provide an improved capillary mat.

Another object is to provide a watering mat for a plant which is formed totally of plastic material.

An additional object is to provide a watering mat for a plant pot which combines the functions of watering and support of the plant in a reservoir of liquid.

A further object is to provide a plant pot watering mat and support which releases water to the plant pot only at selected locations thereby controlling the amount of water provided to the plant pot.

Other objects and advantages of the present invention will become more apparent upon reference to the following specification and annexed drawings in which:

DETAILED DESCRIPTION OF THE INVENTION

Figure 1:
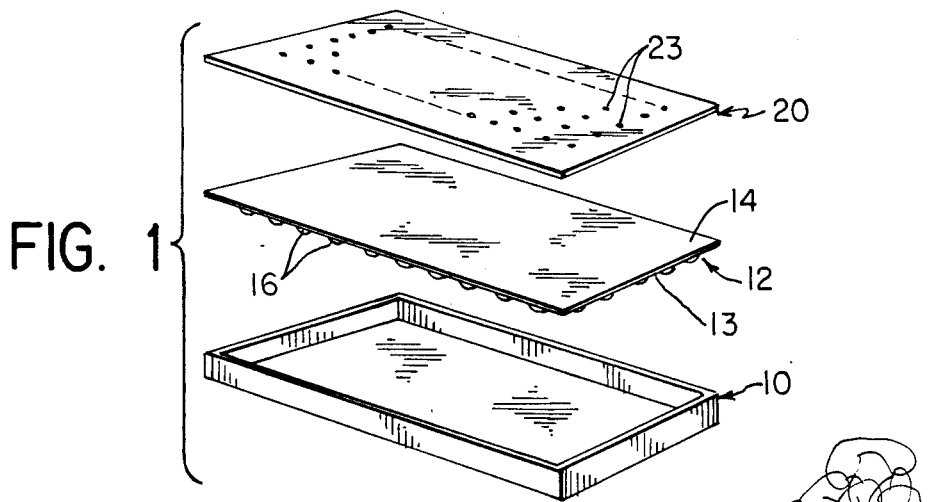
FIG. 1 is a perspective view of the invention shown in exploded form.
Figure 2:
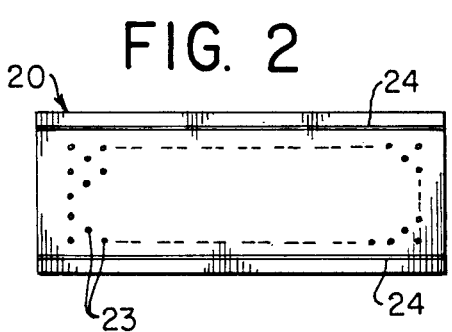
FIG. 2 is a top plan view of the mat of FIG. 1 in assembled form.
Figure 3:
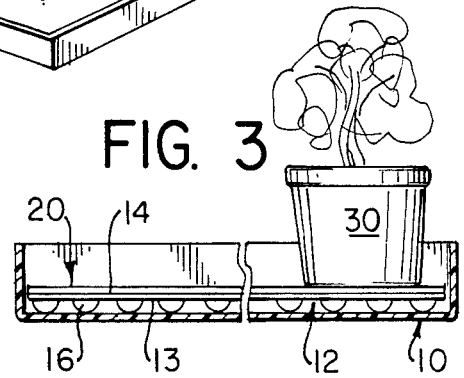
FIG. 3 is an elevational view in cross section showing the mat in the tray with a plant being supported.

Referring to FIGS. 1–3, there is shown a tray 10 of plastic or any other suitable material for acting as a reservoir for water for the plant. The tray can be of any desired size or shape or material.

The watering and support mat of the present invention includes a support piece 12 which is of air-bubble type material whose overall size and shape can correspond to that of the tray or be more or less. The support piece 12 is formed, of two pieces 13 and 14 of plastic material, such as polyethylene or other conventional material. Bottom piece 13 is formed with a plurality of downwardly extending air cells 16 which are spaced apart in any desired configuration. The pattern of air cells shown in FIG. 1 is a regular pattern of rows and columns but this need not be necessary. For example, the rows and columns can be staggered. The air cell piece 13 has sealed to its top the piece of plastic sheet material 14 which seals the individual air cells 16 trapping the air therein. When the walls are placed on a base member, such at the bottom of the tray 10, the support 10 is capable of supporting a weight, such as a plant pot, placed on its top.

To complete the watering mat, a sheet of plastic material 20, for example also of polyethylene is sealed to the top sheet 14 of the air cell support 12. Sheet 20 is, for example, from about 1.5 to 6 mils thick. The plastic sheet 20 has a number of holes 23 therein. The holes are the size, for example, 0:10" to about 0:005". There can be about 10 holes per square inch in the piece 20 although any other suitable number of holes can be used. The holes can be in any pattern. They also can be at selected locations or the sheet.

As seen in FIG. 2, the sheet 20 is sealed to the air bubble support 12 top piece 14 along a rather minimal sealing area such that the two sheets 14 and 20 will not be totally bonded together. That is, there will be a free space between the two sheets 14 and 20 for water to travel. As shown in FIG. 2, there are two sealing seams 24 along the edges of the completed watering mat. The manner in which these seams are formed, is described in greater detail below.

FIG. 3 shows a cross section of the mat in the tray 10 with a plant pot 30 thereon. As seen, when the complete mat 12 is laid down into the tray 10 there is a water reservoir in the space between the air cells 16. The plant pot 30 is placed on the top plastic sheet 20. The air cells 16 form a firm support surface for the plant mat. That is, they support the plant pot 30 so that the plant pot does not rest on the tray bottom.

To start the watering action, the plant itself is watered from the top directly into the soil. The water, when excess water is supplied, will pass out through the bottom of the plant pot and will wet the top layer 20 of the mat and migrate into its space between the two plastic sheets 14 an 20. Water is then poured directly into the tray to fill the spaces between the air cells. Alternatively, water can be poured directly onto the top layer 20 of the mat or directly into the tray to fill up the reservoir in the plant tray. This action is continued until the tray reservoir 10 is completed filled.

Once this priming action is accomplished, thereafter water will be attracted in the space between the top sheet 20 and the top piece 14 of the air bubble support by the Vanderbilt adhesion effect. The water will be available in the space to exit through the holes 22 to keep the bottom of the pot wetted. Thus, the plant is kept watered at all times. It is thereafter only necessary to add water directly into the tray when the water level drops. The water in the reservoir is conserved since it is basically covered and its only exit path is through the relatively small holes in the piece 16. Therefore, only a minimal amount of water is lost by evaporation and the plant is not subjected to any large amount of evaporated water from the tray into which the mat can extend depositing on its foilage.

Figure 4:
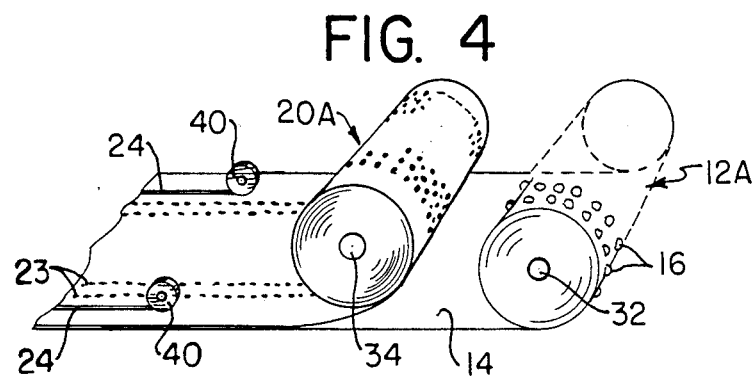
FIG. 4 is a schematic view showing the manufacturing process for making the mat.

FIG. 4 shows a schematic diagram of a system for manufacturing the watering and support mat previously described. There is a roll 12A of the air cell material 12 on a roller 32 which can be driven. Such material is conventional and readily available. The drive mechanism is not shown. Similarly, there is a roll 20A of the plastic sheet material 20 on a roller 34 which also can be driven. The sheet 20 has previously been perforated with the desired number and pattern of holes of the desired size.

The air bubble material 12 and the top sheet 20 are unwound together with the top sheet 20 overlying the top piece 14 of the air cell material. In the downstream travel of the two pieces 12 and 20, there are a pair of heat sealing roller knives 40. These are basically heated rollers of a moderate width, e.g., 1/16–¼1 . Each knife 40 is located adjacent corresponding outer edge of the sheet 40. As the sandwich of the two pieces 12 and 20 travel under the knives 40, the knives transmit the heat through the top perforated sheet 20 to the top piece 14 of the air cell material to seal the two together in a seam area corresponding to the width of each roller. It should be understood that there is no sealing of the two pieces in the space between the two knives 40.

Other types of sealing methods can be used, for example, a random heat sealing pattern over the surface of the top sheet 20. This would be accomplished, for example, by a heated roller type of apparatus with the roller having a number of heated projections. The heated projections would cause a sealing of the two pieces 20 and 14 where they come in contact. The particular type of sealing used for attaching the top sheet 20 to the air bubble piece 12 is not critical. It is only necessary that there be the free space between the two sheets 14 and 20 so that the water from the reservoir can travel therebetween. The sealing also can be accomplished by ultrasonic sealing, adhesives, etc.

The watering mat of the present invention has substantial advantages. The entire structure is of waterproof material. Since the top sheet 20 is of plastic material, it will not become discolored or deteriorated by any reasonable chemical action based upon the constituents of the materials in the plant pot originally or constituents, such as fertilizer, which are added to it. Also, since the holes are relatively small, the evaporation of the liquid from the reservoir is controlled and reduced as compared to a mat where the entire surface is wetted. This makes the water in the reservoir last for a substantially longer period of time.

What is claimed is:

1. A plant watering mat for use in a tray comprising: a first place of waterproof material having upper and lower surfaces,
a second piece of waterproof sheet material having a plurality of holes therein disposed principally unbounded over said upper surface of said first piece,
said lower surface of said first piece formed with a plurality of spaced apart downwardly projecting air cells adopted to rest on the bottom of the tray to provide with said tray a reservoir space for liquid between the cells and a support for an object placed on said second piece when the air cells of said lower surface of said first piece rest on said tray,
the liquid from the reservoir travelling in the unbounded space between the upper surface of said first piece and the lower surface of said second piece to exit through the holes to said object located on the upper surface of said second piece.

2. A plant watering mat as in claim 1 wherein said first and second pieces of material are of plastic.

3. A plant watering mat as in claim 10 wherein said second piece is attached to the upper surface of said first piece first piece along a pair of seams.

4. A plant watering mat as in claim 2 wherein said holes are in the range from about 0.005" to about 0.10" inches in diameter.

5. A plant watering mat as in claim 2 wherein three holes are in the range of from about 25 to 250 holes per square inch.

6. A plant watering mat as in claim 1, wherein said object placed on said upper surface of said second piece is a plant pot.

7. A method of forming a mat for providing water to and support for an object comprising the steps of:
providing a first sheet of water impervious plastic material having spaced projecting air cells on one surface and a substantially flat second surface,
providing a second sheet of water impervious plastic sheet material having a plurality of holes therein,
attaching to said second sheet at selected placed on said other surface of said first sheet and leaving unbounded spaces between the two sheets for water to travel by an adhesion effect between said second surface of said first sheet and said second sheet to exit through said holes to an object supported on said second sheet as said air cells rest on a support surface.

8. A method as in claim 7 wherein said first and second sheets of materials are provided in rolls.

9. A method as in claim 8 wherein said sheets are attached by overlying one on top of the other and applying heat to one of said sheets at said selected locations.

10. A plant watering mat as in claim 2 wherein said second piece is attached to said first piece.

* * * * *